Aug. 9, 1955 R. A. FRYKLUND 2,715,055
DEPTH SOUNDER RECORDER MARKING MEANS
Filed Oct. 6, 1949 6 Sheets-Sheet 1

INVENTOR
ROBERT A. FRYKLUND
BY Elmer J. Gorn
ATTORNEY

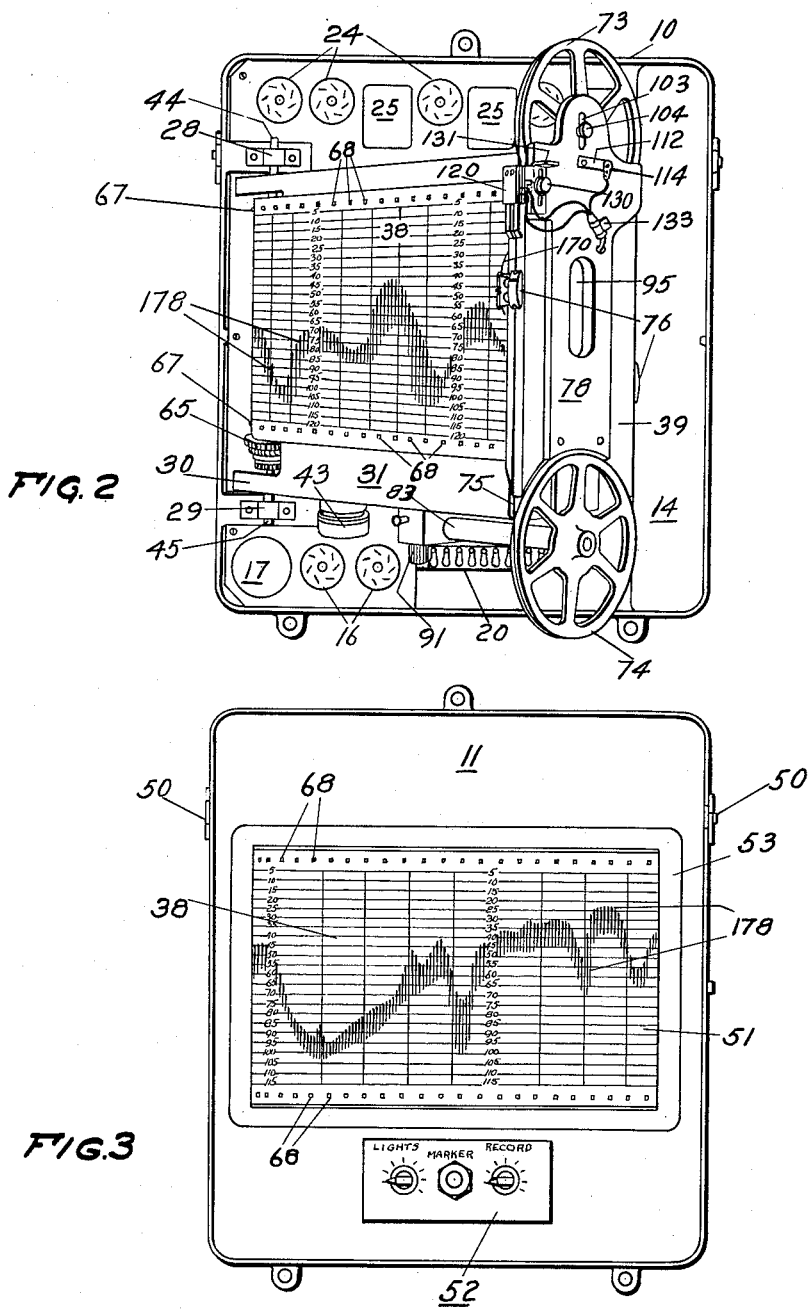

Aug. 9, 1955  R. A. FRYKLUND  2,715,055
DEPTH SOUNDER RECORDER MARKING MEANS
Filed Oct. 6, 1949  6 Sheets-Sheet 3
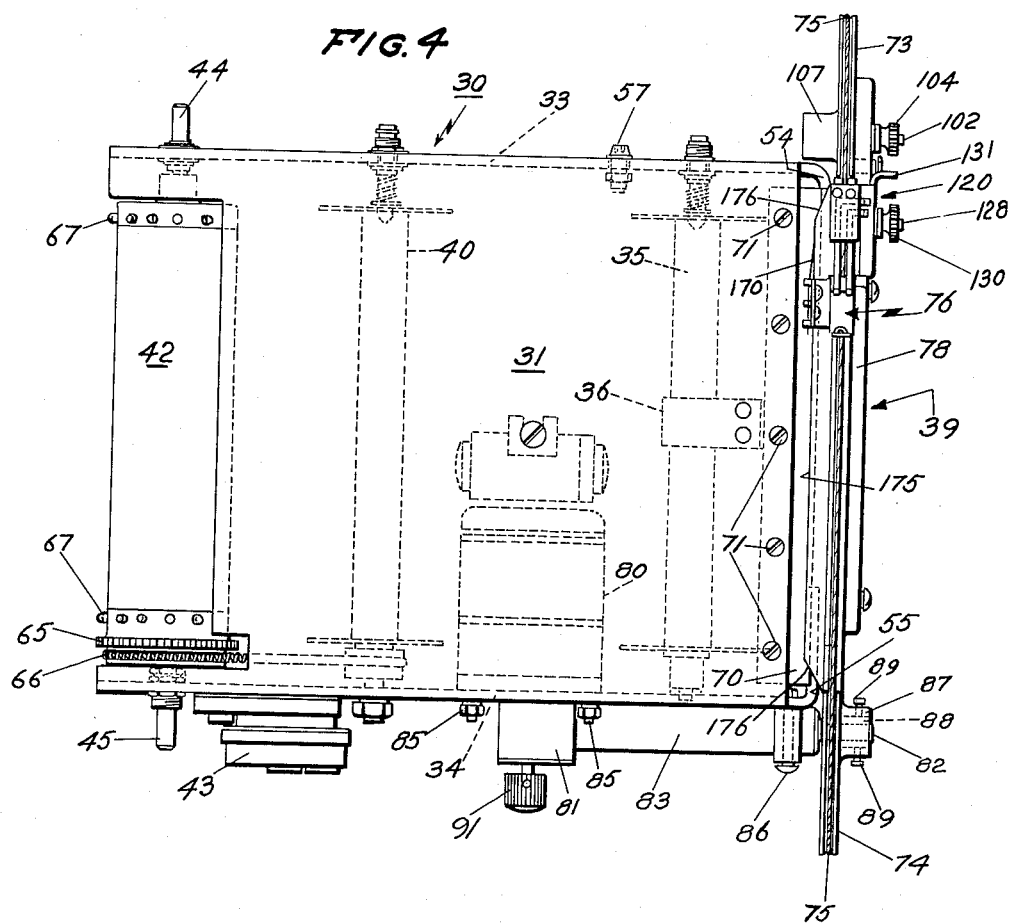
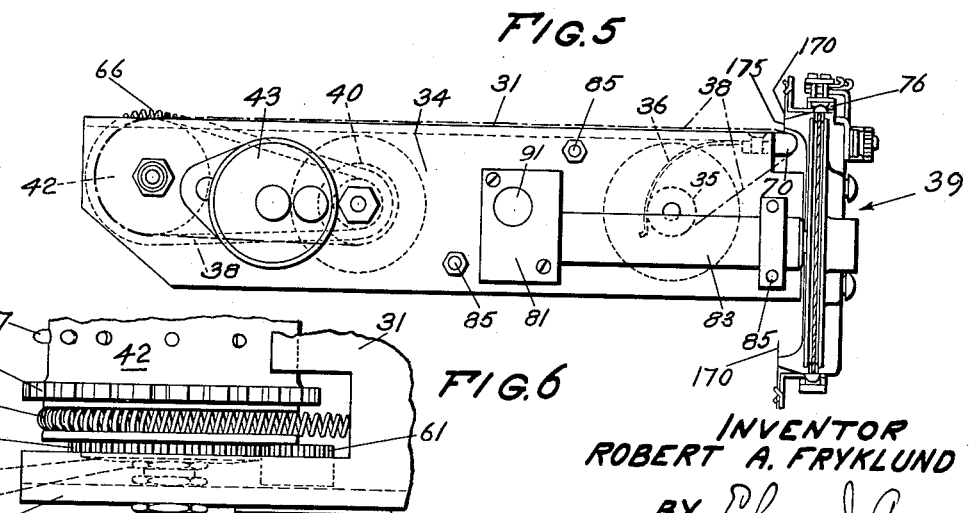
INVENTOR
ROBERT A. FRYKLUND
BY
ATTORNEY Aug. 9, 1955 R. A. FRYKLUND 2,715,055
DEPTH SOUNDER RECORDER MARKING MEANS
Filed Oct. 6, 1949 6 Sheets-Sheet 4
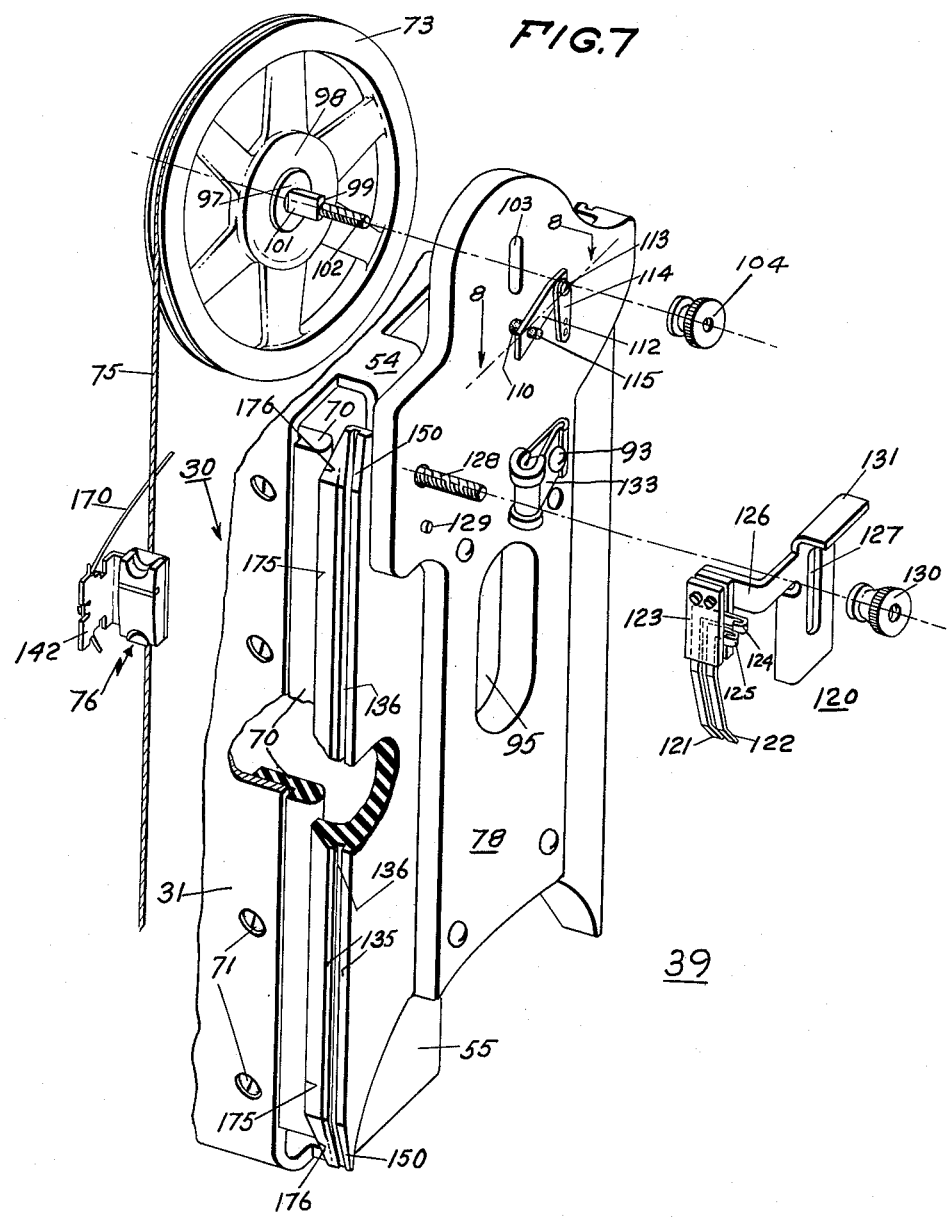
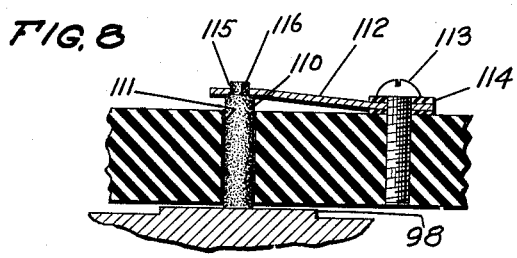
INVENTOR
ROBERT A. FRYKLUND
BY
ATTORNEY

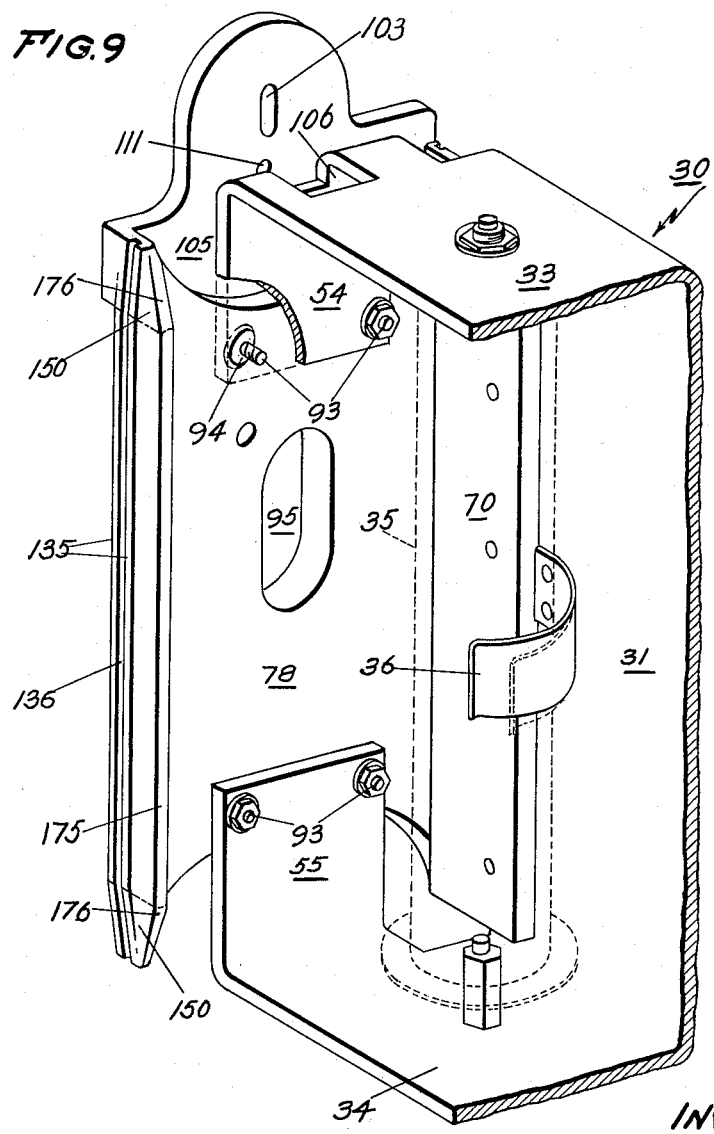

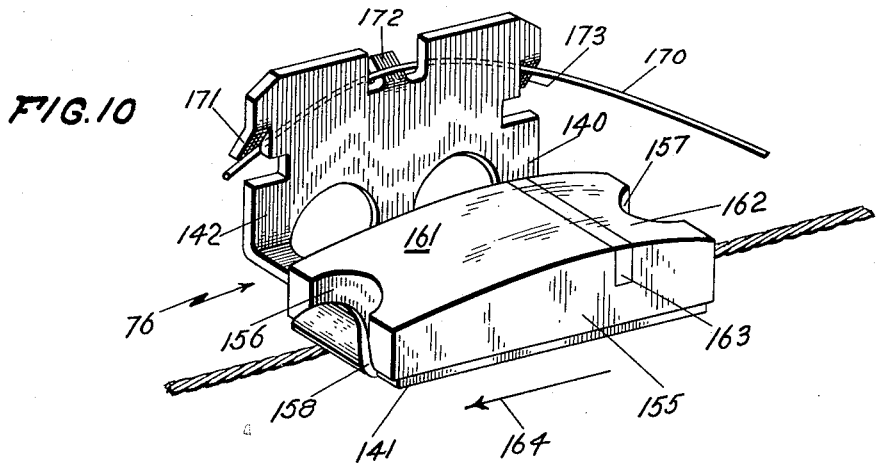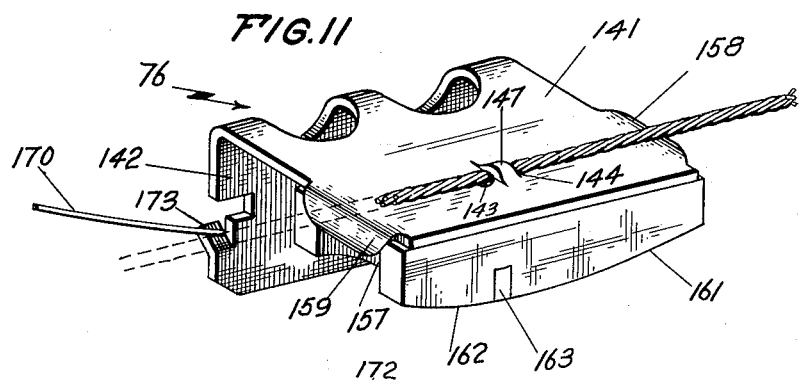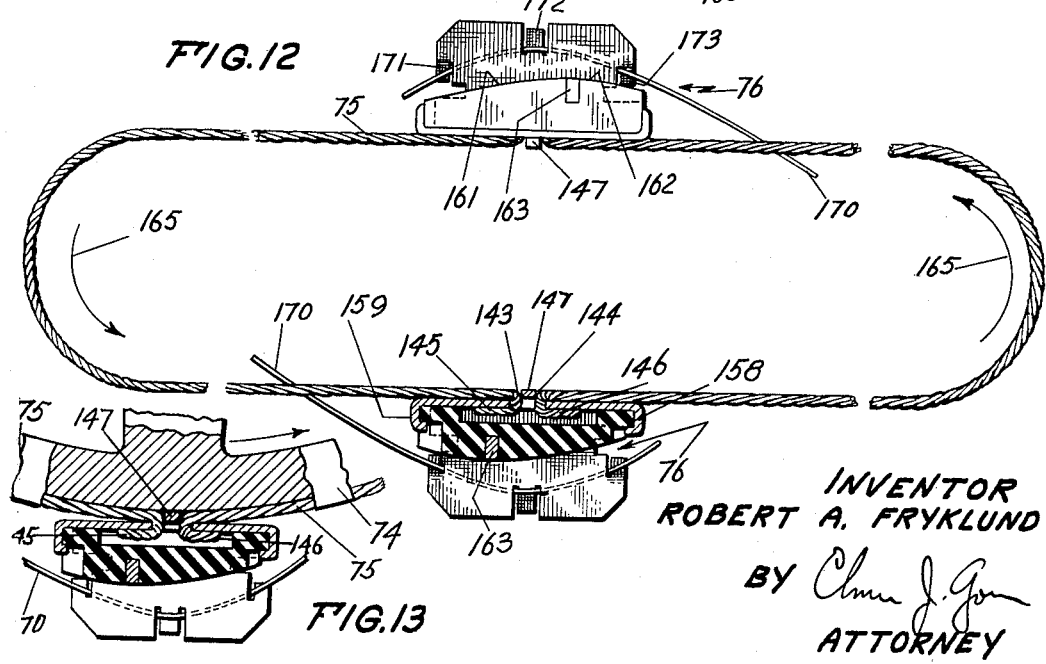

2,715,055
Patented Aug. 9, 1955

United States Patent Office

2,715,055

DEPTH SOUNDER RECORDER MARKING MEANS

Robert A. Fryklund, Somerville, Mass., assignor to Raytheon Manufacturing Company, Newton, Mass., a corporation of Delaware Application October 6, 1949, Serial No. 119,905

2 Claims. (Cl. 346—139)

This invention relates to record making mechanisms for depth sounding devices of the pulse-echo type, and is particularly concerned with improved, compact, and inexpensive mechanisms which can be housed in a common container with electronic transmitter and receiver amplifier elements. The recorder of the invention is of the type employing a record making medium in sheet form having two layers, one of which is electrically conductive and one of which is electrically nonconductive, the medium being marked upon by means of an electrically conductive stylus in contact with the nonconductive layer and suitable electrical potential applied between the stylus and the conductive layer. The stylus is borne on an endless belt which is so disposed with relation to a platen bearing the medium that the stylus makes repeated traverses of the medium when pulley wheels supporting the belt are rotated.

In accordance with the present invention, a rigid base case is provided having sufficient depth to provide volumetric space for the purpose of containing electronic parts for transmitter and receiver amplifier circuits, this volume, however, being divided to supply a small part at one side to house a portion of the belt and pulley mechanism. A pair of pulleys, mounted on the platen, bears a lightweight, cable-type endless belt, which in turn bears one or more styii in an improved manner such that each traverse of a stylus across the paper is in an accurately controlled straight-line path, without a sidewise wobble, or variation in pressure upon the medium. Adjustment and assembly of these parts is simplified to an unexpected degree. Keying of the transmitter is effected by the same belt, the adjustment of the zero position being effected in a novel fashion which also is greatly simplified and accurate.

The foregoing and numerous other features and advantages of the invention will appear from the following detailed description of an embodiment thereof, reference being made to the accompanying drawings wherein:

Fig. 2 is a front view of the recorder of Fig. 1 with the cover removed and the platen partly open;

Fig. 3 is a front view of the recorder of Fig. 1 with the cover closed;

Fig. 4 is a plan view of the platen and record making parts, showing the supply, drive and take-up rolls, as well as the pulley drive motor in dotted line;

Fig. 5 is a bottom view of Fig. 4;

Fig. 6 is an enlarged fragmentary view showing a detail of Fig. 4;

Fig. 7 is an exploded isometric view of certain parts of the record making mechanism;

Fig. 8 is a fragmentary section taken along line 8—8 of Fig. 7, greatly enlarged;

Fig. 9 is a view of the reverse side of certain of the parts shown in Fig. 7, the parts being assembled;

Fig. 10 is an enlarged top quarter view of the marking and switching assembly;

Fig. 11 is a bottom quarter view of Fig. 10;

Fig. 12 is a side view, partly in section, of the assembled belt mechanism; and

Fig. 13 is a fragmentary view illustrating a feature of the belt assembly.

Figure 1:
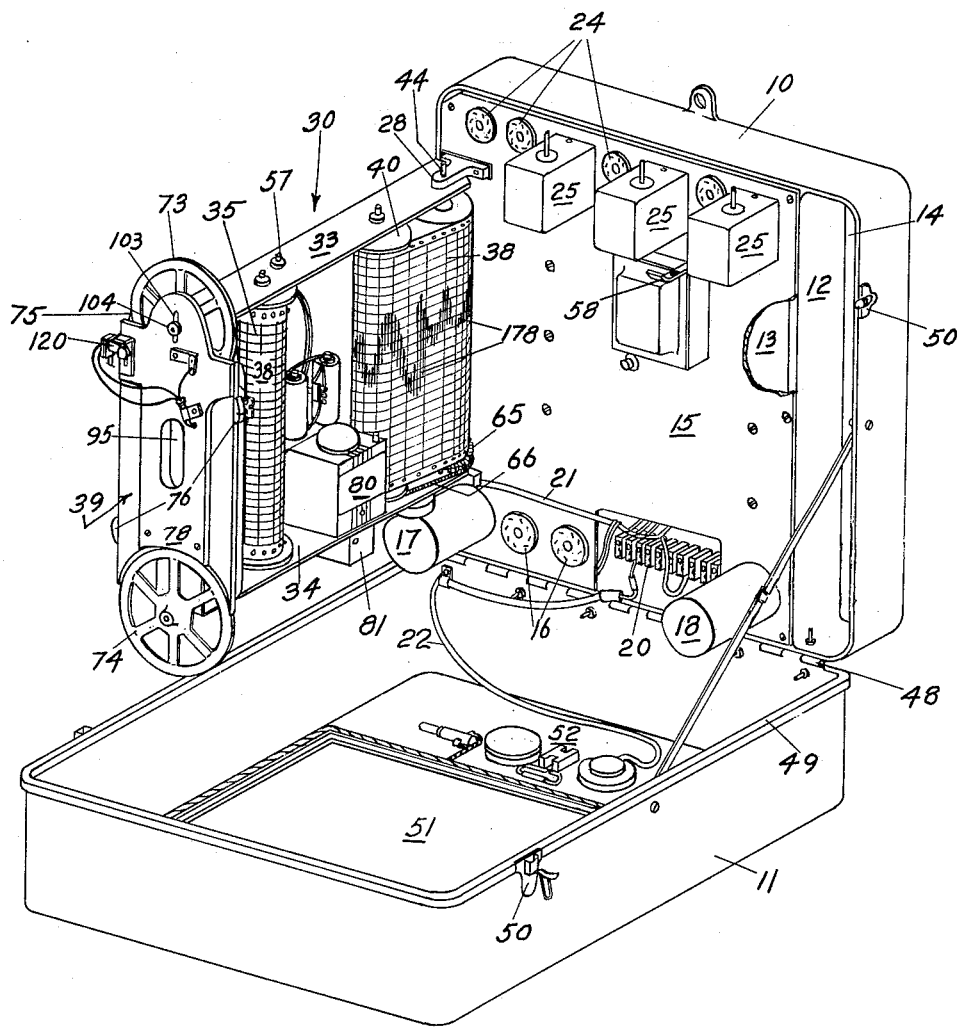
Fig. 1 is an isometric view showing the recorder with parts open, as for servicing or inspection.

Referring now to Figs. 1 through 6, inclusive, the recorder is housed in a case which is in two parts comprising a base 10 and a cover 11. The base 10 is preferably made of a rigid material, such as cast aluminum, and has sides which are sufficiently high to provide a substantial volume therein, for the purpose to be described. A partition 12, which is preferably cast integrally with the base 10, divides the base volume into a major part 13 and a minor part 14. A cover 15 covers the major volume 13 and furnishes a support for electronic components. Thus, along the bottom portion of the cover 15, as seen in Fig. 1, there are tube sockets 16 and containers 17 and 18, which may house condensers and the like, comprising the transmitting equipment of the complete depth sounding system. A portion of the lower edge of the cover 15 is cut away to provide access to terminals 20 for the connection of various electrical cables 21 and 22, for example, used in assembling the system. At the upper edge of the cover 15, as seen in Fig. 1, are found tube sockets 24 and tuning transformers 25 of the receiving and amplifying circuit of the system. In addition to the foregoing many electrical components, such as resistors, capacitors and inductors, which do not appear in Fig. 1, are mounted on the underside of the cover 15 and housed in the major volume 13. As will appear below the minor volume 14 is employed to house a portion of the record making mechanism.

At the left-hand edge of the base 10 are two hinges 28 and 29 which are rigidly attached thereto. A platen 30 is mounted to the base 10 by means of these hinges. The platen 30 comprises a sheet of electrically conductive material, such as iron or steel, which provides a planar surface 31 and top and bottom flanges 33 and 34 disposed rectangularly thereto. A supply roll 35, which furnishes record medium 38, is mounted between the top and bottom flanges 33 and 34, beneath the plane portion 31 near the right-hand edge thereof, as seen in Fig. 4. This roll is free turning, except for a friction spring 36, mounted to the underside of the plane member 31 which engages the supply of record medium 38 and prevents the roll from spinning freely. A take-up roll 40 is mounted between the flanges 33 and 34 intermediate the right and left-hand edges of the plane portion 31. A drive roll 42 is mounted between the flanges 33 and 34 at the left-hand edge of the plane portion 31, and driven by a small motor 43 which is mounted on the underside of the lower flange 34. The axis of rotation of the drive roll 42 is the hinge axis of the platen, and extensions 44 and 45 of this axis are journaled in the hinges 28 and 29, respectively, to support the platen 30 from the base 10. A record making assembly 39, which includes stylus and switch devices as will be explained below, is mounted at the right-hand end of the platen 30. For this purpose the top and bottom flanges 33 and 34 are continued beyond the plane portion 31 of the platen and bent downwardly and upwardly to provide rectangular-disposed ends 54 and 55, respectively, as appears in Fig. 4. This structure will be described in greater detail below in connection with Figs. 7 and 9. The record making assembly 39 lies generally in a plane which is perpendicular to that of the plane portion 31 of the platen, and reposes at least in part in the minor volume 14 of the base 10 when the platen assembly 30 is closed. In the closed position a projection 57 on the upper flange 33 engages a spring catch 58 which is mounted on the cover 15, and hence affixed to the base 10, and is thereby locked.

The cover 11 of the recorder case is hingedly attached to the lower forward horizontal edge of the base 10, as seen in Fig. 1. The cover 11 need not be made of rigid material, but can be drawn from one sheet of aluminum, for example. However, it is preferred to employ a piano hinge 48 to attach the cover to the base, in order to provide rigidity to the cover. A rubber gasket 49 is affixed to the side and top edges of the cover and latches 50 of the suitcase type hold the cover closed tightly against the base with the gasket in compression, thereby furnishing a splash-proof enclosure for the recorder mechanism and electronic parts. A window 51 is provided in the cover 11, through which the record medium 38 may be viewed when the cover is closed. This window is supported in a rubber mounting grommet 53 which relieves the window of shocks which may be incident upon the cover 11. The cover 11 also bears an assembly of switches, generally designated as 52, for controlling the various functions of the system.

Referring again to Figs. 4, 5, and 6, the record medium drive roll 42 is driven by the motor 43 through the medium of gears 61 and 62, as shown in Fig. 6. The larger gear 62 is mounted coaxially with the roll 42 and is frictionally engaged therewith by means of a friction washer 63 and a tension nut 64. The roll 42 is knurled at the lower end as shown at 65, so that it may be turned by hand against the friction provided by the tension nut 64. A belt in the form of a coiled spring 66 engages both the drive roll 42 and the take-up roll 40, so that the take-up roll is driven by the motor 43. The belt 66 can easily slip on the paper roll 40, although sufficient tension is furnished by the spring structure to assure that the take-up roll will be driven so that the taken-up record medium will not be torn. The drive roll 42 is furnished with sprockets 67 at both ends which engage marginal holes 68 in the record medium in a well-known fashion, as appears in Figs. 2 and 3, to advance same at a controlled rate. The motor 43 may be any of the commonly known varieties of small horse power, controllable or controlled speed motors, for example, a synchronous clock motor.

Referring particularly to Fig. 5, the record medium 38 passes from the supply roll 35 over the right-hand edge of the plane platen member 31, continues over the plane surface to the drive roll 42 and thence to the take-up roll 40. All the rolls rotate in a counterclockwise direction as seen in Fig. 5. The right-hand edge of the plane platen member 31 is furnished with a nose piece 70 which is made of an electrically nonconductive material. The nose piece 70 is fastened to the platen by means of screws 71, and provides a smoothly rounded edge over which the record medium 38 passes. As will be explained below, there is a further advantage in the use of an electrically nonconductive material for the nose piece.

The record making assembly 39 consists essentially of a pair of pulley wheels, namely, an upper pulley wheel 73 and a lower pulley wheel 74, each of which is peripherally grooved, and an endless cable 75 which runs over the pulley wheels in the grooves. The cable 75 bears a stylus and switch assembly 76 which will be discussed in detail below in connection with Figs. 10 through 12, inclusive. The upper pulley 73 is adjustably carried by a rigid, electrically nonconductive member 78 which, as will appear from a detailed description to follow in connection with Figs. 7 through 9, inclusive, is the foundation member of the record making assembly 39. The lower pulley 74 is mounted on the lower flange 34 of the platen 30.

A motor 80 drives the lower pulley 74 through the medium of gears (not shown) in a housing 81 and a shaft 82 which is enclosed in a shaft housing 83. The motor 80 is affixed to the inner side of the flange 34, being thus nested against the under surface of the plane member 31, by means of bolts 85. The shaft housing 83 is affixed to the outer or lower surface of the flange 34 by means of bolts 86 at the outer end thereof. The lower pulley 74 is journaled on the shaft 82 at its hub 87, an electrically nonconductive bushing 88 being interposed between the hub and the shaft. Locking screws 89 are furnished in the hub 87 for the purpose of rigidly affixing the lower pulley 74 to the shaft 82. A knurled hand knob 91 engages the gears in the gear housing 81 for the purpose of turning the lower pulley 74 by hand so that adjustments in the operation of the record making assembly 39 can be made.

Referring now to Figs. 7 through 9, inclusive, and particularly to Fig. 9, the foundation member 78 of the record making assembly 39 is affixed to the ends 54 and 55 of the platen 30 by means of bolts 93. A small boss 94 is provided on the inner surface of the foundation member 78 at each bolt 93 so that the main body of the foundation member is spaced a small distance from the platen mounting ends 54 and 55. A somewhat slot-like aperture 95 is provided in the foundation member which, as will be appreciated from Figs. 1 and 2, is a hand hold, large enough to admit one or more fingers, enabling an operator to move the platen about its hinge axis without touching any of the moving parts thereof.

Referring now particularly to Fig. 7, the upper pulley 73 is mounted on a bearing (not shown), the housing 97 of which projects beyond the plane of the hub 98 of the pulley. A bolt 99 is journaled in the bearing. This bolt has a flattened body portion 101 and a threaded end portion 102. The upper end of the foundation member 78 is furnished with a slotted aperture 103 wherein the flattened body portion 101 slidably fits. A knurled nut 104 engages the threaded end 102 of the bolt 99 and clamps the bearing housing 97 tightly to the foundation member 78, so that the upper pulley is freely rotatable at all times, but adjustable in position in the slotted aperture 103. In this manner the upper pulley 73 can be adjusted in position with respect to the lower pulley 74 in order to remove, replace and adjust the tension of the endless belt 75. When the upper pulley 73 is fixed in position on the foundation member 78, it reposes in a recess 105 in the foundation member, seen most clearly in Fig. 9. A portion of the upper mounting end 54 of the platen 30 is cut away at 106 to provide room for the rear hub 107 (seen in Fig. 4) of the upper pulley 73 when the upper pulley is adjusted.

The front hub 98 of the upper pulley 73 provides a flat and smooth annular surface which confronts the foundation member 78. An electrically conductive brush 110 makes contact with this surface through a hole 111 in the foundation member 78, as is shown in detail in Fig. 8. The brush 110 is maintained in contact with the hub surface 98 by an elongated flat-leaf spring 112 which is fastened at one end to the side of the foundation member 78 by means of a screw 113, which holds also a lug 114 by means of which an electrical connection is made to the brush. The spring member 112 has a hole in its free end through which the outer end 115 of the brush 110 fits. The outer end 115 is reduced in diameter to provide a bearing shoulder 116 against which the spring 112 applies force to maintain the brush in contact with the upper pulley 73.

The foundation member 78 carries also a keying switch assembly 120, having two electrical contacts 121 and 122 mounted in an electrical insulating block 123 and provided with lugs 124 and 125, respectively. The block 123 is fastened to a bracket 126 which is provided with a slotted aperture 127 which fits over a threaded stud or bolt 128 which is carried by the foundation member 78. A second shorter unthreaded stud 129 is carried by the foundation member 78, and cooperates with the threaded stud 128 to prevent the bracket from wobbling out of a predetermined position when it is being adjusted. A knurled hand nut 130 cooperates with the bolt 128 to hold the bracket 126 in a fixed position upon the foundation member 78, in which position both studs 128 and 129 repose in the slotted aperture 127. A bent-over ear 131 is used to adjust the bracket 126 when the hand nut 130 is loosened. The switch 120 is so disposed that the switch portion of the stylus and switch assembly 76 is able to cooperate with it for the purpose of triggering the transmitter of the sounding system, as will be described in greater detail below. A clamp 133 is mounted on the foundation member 78, by means of one of the bolts 93, for the purpose of securing the wires which are electrically connected to the lugs 114, 124, and 125.

The foundation member 78 provides also a platform 135 whereon the stylus and switch assembly 76 slides as it passes between the pulleys 73 and 74. The platform 135 has a groove 136 therein in which the cable 75 passes so that the stylus and switch assembly 76 can rest firmly on the platform 135 without wobbling. In the record making assembly 39 the two pulleys 73 and 74 are so disposed with respect to the foundation member 78 that the endless belt 75 passes through the groove 136. As is shown in Fig. 9, the platform 135 and groove 136 are duplicated on both sides of the foundation member 78. However, as is shown in Fig. 7, only one such side of the foundation member 78 is disposed to cooperate with the platen 30. The duplication of structure on both sides of the foundation member 78 provides a balanced structure which can be formed of plastic and is less apt to become warped upon cooling or after continued use than an unbalanced structure.

Referring now to Figs. 10 through 12 inclusive, the stylus and switch assembly consists of a metallic sheet, such as stainless steel, which is formed into a bracket 140 having a base or bottom portion 141 and a rectangularly-disposed side portion 142. The bottom portion 141 is provided with two holes 143 and 144, seen in Figs. 11 and 12. The cable 75 is a multistrand metallic cable, of any suitable material, and, as shown in Fig. 12, is provided with two stylus and switch assemblies 76, although it might be constructed with one such assembly if desired. The cable is attached to the bottom portion 141 of the bracket 140 by inserting the free ends 145 and 146 into the holes 143 and 144, respectively, and bending them back to form U-shaped ends of which the bights confront each other. The cable in this position is preferably treated with a solder which binds the strands together at the bights in order that the strain upon the strands may be uniformly distributed. The U-shaped ends of the cable are not, however, soldered to the material of the bracket 140, but rather cooperate therewith in the manner of links of a chain. The material of the bottom portion 141 intermediate the holes 143 and 144 is struck outwardly at 147 so that it rests between the legs of the U-shaped ends of the cable which continue on into the main body of the cable. This bent-out portion 147 prevents the cable ends from becoming disengaged from the base portion 141, and at the same time permits free chain-like action. It is the bottom or base portion 141 of the stylus and switch assembly which slides on the platform 135 of the foundation member 78, while the cable 75 and struck-out portion 147 move in the groove 136. In order to provide that the bottom portion 141 will be maintained in contact with the platform 135, the platform 135 is elevated above the plane which contains a line which is tangent to both pulleys 73 and 74; that is, the plane of the platform 135 is further away from a line joining the centers of the two pulleys than the plane containing a line which is tangent to the two pulleys. For this purpose the ends of the platform 135 are sloped slightly at 150. This arrangement provides also for the possibility that the stylus and switch assembly, in its circular flight around the pulleys, will tend to fly off the pulleys by centrifugal force. If it is attempted to urge the stylus and switch assembly to follow a line which is tangent to the two pulleys in its passage between the two pulleys, it is necessary to overcome this centrifugal tendency, which would introduce a variation in pressure of the stylus and switch assembly upon the platform 135. This in turn causes uneven recording. In the present invention, the stylus and switch assembly is permitted a sufficient degree of centrifugal freedom to overcome this defect. Another advantage of the structure thus far described is that, by virtue of the closeness of the holes 143 and 144 and the chain-like construction employed in assembling the cable to the base 141, the stylus and switch assembly moves around the pulleys 73 and 74 without tending to lift the cable 75 from the periphery of the pulleys, as is apparent from Fig. 13. To this end the peripheral grooves in the pulleys are preferably not greater in depth than the diameter of the cable 75, as deeper peripheral grooves cause the base 141 to be lifted from the cable.

The base or bottom portion 141 of the bracket 140 carries a block 155 of electrically nonconductive material, which in the present embodiment is, for reasons that will appear, preferably nylon or the like. The block 155 is rectangular in plan and is provided with indented portions 156 and 157 at its ends. The base portion 141 is provided with extensions 158 and 159 which are bent up and over block 155 to repose in the indented portions 156 and 157, respectively, and thereby clamp the block firmly to the base. The upper surface of the block 155 is humped intermediate the ends thereof, having a long sloping surface 161 and a surface of shorter slope 162. At the top of the hump between the sloped surfaces 161 and 162 there is embedded in the block 155 a strip of electrically conductive material 163, disposed transversely to the long dimension of the block, and lying flush with the top surface. The direction of motion of the assembly 76 is as indicated by the arrow 164 in Fig. 10, the pulleys 73 and 74 being rotated as indicated by arrows 165 in Fig. 12. The block 155 is thus moved to bring the long sloping surface 161 in contact with switch contacts 121 and 122 of switch 120 when the pulley 74 is rotated. Since nylon has lubricating properties, it is preferred for this use. The electrically conductive bar 163 momentarily bridges the contacts 121 and 122 to close the switch 120, the instant of bridging being adjusted by means of the slotted aperture 127 and the hand nut 130 (Fig. 7). The lugs 124 and 125 of switch 120 are wired to the electronic transmitter circuit, which, although not shown herein, may be of many kinds well known to those skilled in the art. Such circuits are ordinarily keyed or pulsed by momentarily closing a pair of contacts such as contacts 121 and 122 with a shorting bar such as bar 163. As will be appreciated from Fig. 2, the switch 120 is properly disposed for adjusting the zero position of the record medium 38.

The stylus and switch assembly 76 carries also the marking stylus 170 which marks the record medium 38. The side portion 142 of the bracket 140 is provided with three lugs 171, 172, and 173, which are struck out from the body thereof. Lugs 171 and 173 are downwardly directed and bent outwardly, as viewed in Fig. 10, for example, while lug 172 is upwardly directed but also bent outwardly. The stylus 170 consists of a suitable length of a relatively stiff electrically conductive wire, such as tungsten, for example, which is looped over the intermediate lug 172 and hooked under the end or outer lugs 171 and 173. This assembly is shown in greater detail in Patent No. 2,627,448, issued February 3, 1953, to Edgar Horton. This simple arrangement bends the stylus wire against its own desire to remain straight and firmly holds the stylus 170 in place and at the proper angle for establishing a sliding contact with the record medium 38. As will be appreciated from Figs. 4, 7, and 10, in particular, the angle of the stylus 170 is such that the stylus may be easily drawn across the record medium 38 in the manner of a pencil sloping at the proper angle for smooth writing on paper without tearing the paper. The length of the stylus 170 is readily adjustable by the simple expedient of sliding the stylus in its holder, lugs 171, 172, and 173.

Referring again to Fig. 7, the edges of the foundation member 78, which as we have seen bear the platforms 135 and the grooves 136 which guide the stylus and switch assembly 76, bear also a flanged or straight edge 175 which is disposed in the path which would normally be followed by the stylus 170 in passing between the pulleys 73 and 74, and traversing the record medium 38. The end portions 176 of the straight edges 175 are sloped back toward the main body of the foundation member 78. Thus, as can be seen best in Fig. 4, the stylus 170 approaches the upper sloping edge 176 and is thereby deflected from the path it normally tends to follow and caused to follow the straight edge 175 in the same manner as a pencil which is drawn along the edge of a ruler. This causes the stylus to follow an accurately determined straight path across the record medium 38, with the result that the successive marks 178 (Figs. 2 and 3) which are made by the stylus on the record medium are evenly spaced and provide a greatly improved record. This is a particularly valuable feature when the belt 75 carries more than one stylus. It will, of course, be remembered that the record medium 38 is moved from right to left as seen in Figs. 2, 3, and 5, so that the marks 178 are spaced from each other. The electrical signals which are employed to make the marks 178 are furnished to the stylus by the receiver amplifier circuit of the complete sounding system in a manner that will presently be described.

The deflection of the stylus 170 from its normal path by the straight edge 175 does not pull the stylus and switch assembly 76 laterally out of its normal path for the reason that the groove 136 holds the belt 175 and projection 147 against such lateral motion. Nor does this deflection of the stylus cause the stylus and switch assembly to wobble on the platform 135 for, as has already been explained, this platform is so placed that the assembly 76 is held tightly to the platform by the tension on the cable 75. This tension can be adjusted with the hand nut 104 co-operating with the slotted aperture 103 in the foundation member 78. This tension also provides that the stylus and switch assembly 76 will cause the stylus to bear uniformly on the record medium 38 as it travels across it, thereby assuring that the density of the markings 178 is uniform as far as the pressure of the stylus is concerned.

As the lower pulley 74 is rotated, the stylus makes repeated and somewhat rapid traverses of the record medium 38. However, each such traverse brings the stylus first in contact with the nose piece 70 of the platen 30. The pulleys 73 and 74 are made of an electrically conductive material, and the cable 75 is likewise electrically conductive. Signals from the receiver are applied to the upper pulley 73 via lug 114 and the brush 110, proceeding thence via the cable 75 of the bracket 140 to the stylus 170. The platen 30 is the other terminal as far as the signal voltage is concerned, and the electrically conductive layer of the record medium 38 rests on the plane portion 31 thereof. Thus the signal voltage is applied across the electrically nonconductive layer of the record medium 38 between the stylus 170 and the plane portion 31 of the platen. If the nose piece 70 of the platen is electrically conductive and a signal voltage appears between the stylus and the platen at the instant the stylus comes in contact with the nose piece and prior to the instant at which it arrives on the record medium 38, it is possible that the tip end of the stylus will become welded to the platen and thereby either pull the stylus from its holder entirely or displace it in the holder. The position of the stylus in the holder must, of course, be determined with care so that the markings 178 will provide an accurate measure of distance or depth. The provision of an electrically nonconductive nose piece 70 prevents such welding, or indeed any sparking which tends to injure the stylus. The electrically conductive layer which is part of the record medium 38 is sufficiently conductive to provide an electrical extension of the platen to the point of contact with the stylus.

It will be appreciated that many variations of the features shown and described herein in connection with the single embodiment of the invention illustrated will occur to those who are skilled in the art to which the invention relates. It is, therefore, intended that the claims which follow shall not be limited by the particular details of the illustrated embodiment but rather by the prior art.

What is claimed is:

1. Recorder apparatus comprising a pair of pulley wheels, an endless belt engaged with said wheels, a stylus carrier attached to said belt, a platform disposed between said wheels in a plane parallel to a common tangent of said wheels, said platform being disposed so that said carrier slides thereon in its travel between said wheels, a flexible stylus carried by said carrier, a straight edge on said platform parallel to the path of travel of said carrier disposed in the path of said stylus, said straight edge being laterally displaced in a direction parallel to said plane relative to said path a distance sufficient to deflect said stylus to one side of the path it normally tends to follow whereby said stylus follows said straight edge when said carrier travels along said platform.

2. Recorder apparatus comprising a pair of pulley wheels, an endless belt engaged with said wheels, a stylus carrier attached to said belt, a platform disposed between said wheels in a plane parallel to a common tangent of said wheels, said platform being disposed so that said carrier slides thereon in its travel between said wheels, a flexible stylus carried by said carrier, a straight edge on said platform parallel to the path of travel of said carrier disposed in the path of said stylus, said straight edge being laterally displaced in a direction parallel to said plane relative to said path a distance sufficient to deflect said stylus to one side of the path it normally tends to follow whereby said stylus follows said straight edge when said carrier travels along said platform, a straight track on said platform parallel to said straight edge, and track engaging means on said carrier to prevent lateral deflection of said carrier in said plane when said stylus is engaged by said straight edge.

References Cited in the file of this patent

UNITED STATES PATENTS

| Number | Name | Date |
| --- | --- | --- |
| 2,008,970 | Spitzglass | July 23, 1935 |
| 2,074,118 | Ross et al. | Mar. 16, 1937 |
| 2,184,973 | Finch | Dec. 26, 1939 |
| 2,192,656 | Stone | Mar. 5, 1940 |
| 2,212,970 | Finch | Aug. 27, 1940 |
| 2,278,919 | Erickson et al. | Apr. 7, 1942 |
| 2,342,171 | Turner | Feb. 22, 1944 |
| 2,346,670 | Engler et al. | Apr. 18, 1944 |
| 2,404,975 | Mathes | July 30, 1946 |
| 2,408,458 | Turner | Oct. 1, 1946 |
| 2,442,586 | Clark | June 1, 1948 |
| 2,464,970 | Finch | Mar. 22, 1949 |
| 2,491,020 | Winchel | Dec. 13, 1949 |
| 2,510,575 | Hathaway | June 6, 1950 |
| 2,597,199 | Stamper | May 20, 1952 |